United States Patent [19]

Shimizu

[11] Patent Number: 4,687,976
[45] Date of Patent: Aug. 18, 1987

[54] ELECTROMAGNETIC SERVO DEVICE FOR ELECTRIC POWER STEERING SYSTEMS FOR VEHICLES

[75] Inventor: Yasuo Shimizu, Tochigi, Japan
[73] Assignee: Honda Giken Kogyo, Toyko, Japan
[21] Appl. No.: 773,972
[22] Filed: Sep. 9, 1985
[30] Foreign Application Priority Data
Sep. 12, 1984 [JP] Japan ................... 59-192390
[51] Int. Cl.$^4$ ............................................ G05B 11/10
[52] U.S. Cl. .................... 318/432; 318/489; 318/624; 180/6.28; 180/6.44
[58] Field of Search ............... 318/488, 489, 580, 624, 318/432; 310/68 B, 92, 94; 180/6.28, 6.44, 6.5, 79, 141, 142, 143

[56] References Cited

U.S. PATENT DOCUMENTS

| 2,754,465 | 7/1956 | Brier | 318/488 |
| 4,415,054 | 11/1983 | Drutchas | 180/142 X |
| 4,522,278 | 6/1985 | Kitagawa et al. | 180/142 X |

FOREIGN PATENT DOCUMENTS 58-141963  8/1983  Japan .................. 180/6.28

Primary Examiner—William M. Shoop, Jr.
Assistant Examiner—Bentsu Ro
Attorney, Agent, or Firm—Armstrong, Nikaido, Marmelstein and Kubovcik

[57] ABSTRACT

An electromagnetic servo device for electric power steering system for vehicles including a driving control circuit (100) adapted to generate a torque magnitude signal (Sa) and a torque direction signal (Sdr, Sdl), based on an output signal (VR, VL) from a torque detection mechanism (11) for detecting steering torque (Ti) acting on an input shaft (1) connected to a steering wheel and an output signal (Vf) from a vehicle speed detection mechanism (50), and to feed, to an electric motor (18) for applying auxiliary torque to an output shaft (4) operatively interconnected with a steered wheel, an armature current (Io) of such a magnitude and in such a direction of conduction as desirous in accordance with both the torque magnitude signal (Sa) and the torque direction signal (Sdr, Sdl), and a dead zone (2K$_1$ or Dl, Dm, Dh) set for the torque magnitude signal (Sa), wherein the dead zone (2K$_1$ or Dl, Dm, Dh) of the torque magnitude signal (Sa) has a band width thereof widened with increase of the vehicle speed, in accordance with the output signal (Vf) from the vehicle speed detecting mechanism (50).

8 Claims, 21 Drawing Figures

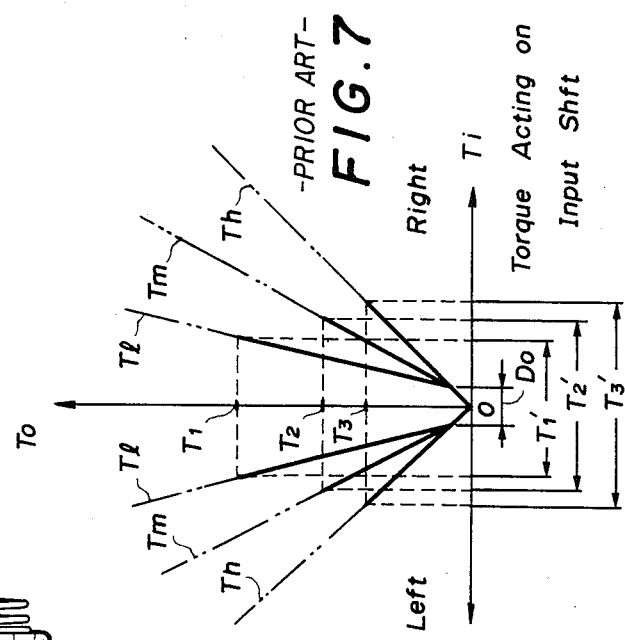
FIG. 7 —PRIOR ART—
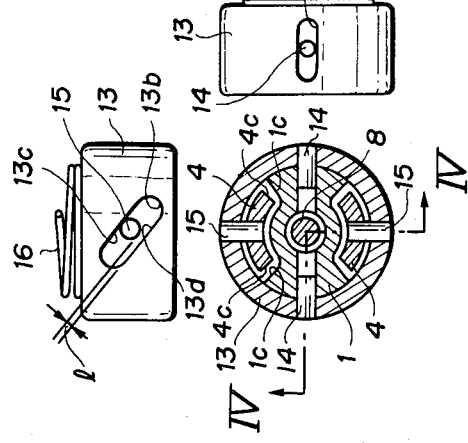
FIG. 5A  FIG. 5B  FIG. 5C
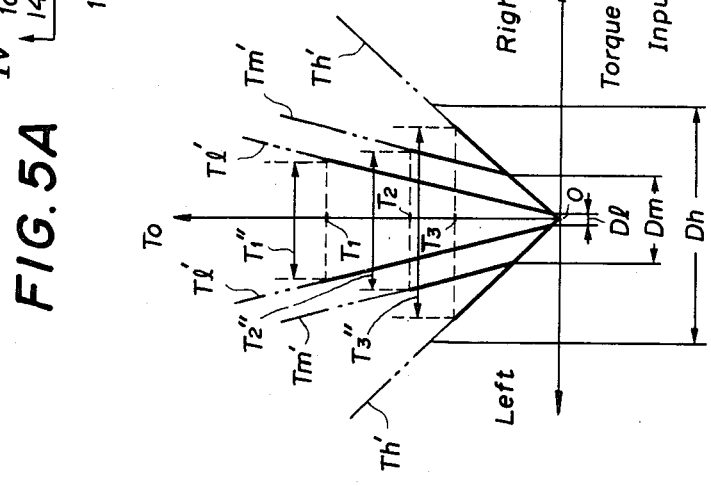
FIG. 6

ELECTROMAGNETIC SERVO DEVICE FOR ELECTRIC POWER STEERING SYSTEMS FOR VEHICLES

BACKGROUND OF THE INVENTION

1. Field of the Invention

The present invention generally relates to an electromagnetic servo device. More particularly, the invention relates to an electromagnetic servo device for electric power steering systems for vehicles.

2. Description of Relevant Art

In view of problems on the hydraulic type power steering system for vehicles, such as that the structure thereof was complicated and that, due to the necessity of constantly operating a hydraulic pump, the power loss was relatively large, in recent years there have proposed a variety of electric type power steering systems for vehicles.

In those electric type power steering systems were employed various types of electromagnetic servo device.

Those types of electromagnetic servo device included an input shaft adapted to be operatively connected to a steering wheel, an output shaft adapted to be operatively connected, through a steering gearbox or otherwise, to a tie rod of a road wheel to be steered, an electric motor for supplying the output shaft with auxiliary torque, a torque detection mechanism for detecting the magnitude as well as the direction of steering torque acting on the input shaft, and a driving control circuit for sending to the electric motor an armature current of such a magnitude and in such a direction as necessary in accordance with a detection signal from the torque detection mechanism.

By the working of such servo device, the electric type power steering systems had adequately lightened steering forces needed to be exerted for operating the steering wheel, thus achieving favorable steering characteristics.

In this respect, those power steering systems had accompanied desiderata in relation to preference for rapid application of relatively large auxiliary torque to the output shaft of servo device at low vehicle speeds as well as for controlled application of auxiliary torque thereto at middle and high vehicle speeds; the preference arising from the fact that, in general, the necessary force to be exerted for operating a steering wheel is relatively large at low vehicle speeds, but not so large at middle and high vehicle speeds.

To achieve such desideratum, there has been disclosed an electric power steering system for vehicles in Japanese Patent Application Lay-Open Print No. 50-38228, laid open on Apr. 9, 1975, in which an electromagnetic servo device included an electric motor having an armature current controlled to be sent thereto in accordance with the vehicle speed.

In this Japanese Patent Application Lay-Open Print, the ratio (Io/Ti) of the armature current (Io) to steering torque (Ti), that is, the ratio of the armature current to torque acting on an input shaft of the electromagnetic servo device, was controlled to be decreased as the vehicle speed was increased. More particularly, the above ratio (Io/Ti) was controlled to be substantially continuously changed from a certain value to zero, as the vehicle speed was varied from a certain low speed to a predetermined high speed, whereas the input shaft of the servo device was adapted to be directly coupled with an output shaft thereof when the ratio (Io/Ti) was reduced to zero.

Thus, in the electric power steering system according to the aforesaid Japanese Patent Application Lay-Open Print, between the torque (Ti) acting on the input shaft of the electromagnetic servo device and output torque (To) from the output shaft thereof, there were found such relations as shown in FIG. 7 of the accompanying drawings. FIG. 7 is a graph representing an input-output characteristic of the above electric power steering system.

In FIG. 7, the axis of abscissa represents the torque Ti acting on the input shaft, and the axis of ordinate, the output torque To of the output shaft. Designated at reference character Do is the dead zone of a torque detection mechanism in the electromagnetic servo device.

Now, for the aid of comprehension, description will be made below only of a region extending to the right of an origin O of the graph of FIG. 7, that is, of the characteristic relations of the steering torque Ti to the output torque To, when the former is acting in a clockwise direction about the input shaft. Those relations depicted in the left half region of the graph are analogous to those depicted in the above-defined right half region, and will be easily understood without particular description.

While the vehicle speed was kept at a given speed in a low speed region, as the steering torque Ti acting on the input shaft was increased from zero, the output torque To increased, in the interior of the dead zone Do, along a line segment Th straightly extending from the origin 0 with a certain positive gradient and, in the exterior of the dead zone Do, along another line segment Tl straightly extending, from the cross point between the line segment Th and the boundary of the dead zone Do, with a larger gradient than the gradient of the line segment Th.

While the vehicle speed remained at a given speed in a middle speed region between the low speed region and a high speed region, as the steering torque Ti was increased from zero, the output torque To increased, in the interior of the dead zone Do, again along the line segment Th and, in the exterior of the dead zone Do, along still another line segment Tm straightly extending from the aforesaid cross point with a middle gradient between the respective gradients of the line segments Th and Tl. This is because the ratio Io/Ti of the armature current Io to the steering torque Ti was decreased, in accordance with the vehicle speed change from the low speed to the middle speed, as already described.

On the other hand, while the vehicle speed was maintained at a given high speed equal to or higher than the aforesaid predetermined high speed, as the steering torque Ti was increased from zero, the output torque To increased, in both the interior and the exterior of the dead zone Do, along the line segment Th, thus simply corresponding to the steering torque Ti. This is because, at those vehicle speeds equal to or higher than the predetermined high speed, the armature current Io was controlled to be zero and the input shaft was directly coupled with the output shaft, as already described.

With such input-output characteristic, the electric power steering system according to the aforesaid Japanese Patent Application Lay-Open Print achieved a favorable control of the output torque to be varied in accordance with the vehicle speed.

As is observed in general cases, in this power steering system, at given speeds in the low, middle, and high speed regions, the output torque To from the output shaft had proper ranges of values thereof, respectively, of which maximum torque quantities $T_1$, $T_2$, and $T_3$ were such that $T_1 > T_2 > T_3 > 0$, and corresponding domains $T_1'$, $T_2'$, and $T_3'$ of definition of the steering torque Ti, on which the output torque To was allowed to vary while ranging from zero to the maximum quantities $T_1$, $T_2$, and $T_3$, respectively.

In this respect, in this power steering system, in which the dead zone Do had a constant band width independent of the vehicle speed, the proportion that the width of the dead zone Do occupied in that of such domain of the steering torque Ti was relatively large while the vehicle speed was in the low speed region, particularly when the speed was close to zero.

As a result, during an initial phase of the rotating operation of a steering wheel, the electric motor in the electromagnetic servo device was kept from being energized, so that the vehicle's driver had to exert relatively large steering forces to the steering wheel and thus the steering operation felt relatively heavy.

On the other hand, while the vehicle speed was maintained, in the high speed region, at a slightly lower speed than the aforesaid predetermined high speed, the steering torque Ti had a domain thereof narrowed to be somewhat smaller in width than the domain $T_3'$ given at the predetermined high speed, so that the proportion of the width of the dead zone Do to that of the domain of the steering torque Ti was relatively small.

As a result, in this power steering system, when it was operated, the electric motor of the electromagnetic servo device was likely to have on and off states thereof frequently repeated, whereas such repetition is unfavorable to the durability of the servo device itself as well as of the steering system.

The present invention has been achieved to effectively overcome such problems in conventional electromagnetic servo device for electric power steering systems for vehicles.

SUMMARY OF THE INVENTION

According to the present invention, there is provided, in an electromagnetic servo device (200) for an electric power steering system for vehicles having a steering wheel and a steered wheel, the servo device (200) including an input shaft (1) adapted to be connected to the steering wheel, an output shaft (4) adapted to be operatively interconnected with the steered wheel, an electric motor (18) for providing the output shaft (4) with auxiliary torque, a torque detecting means (11) for detecting steering torque (Ti) acting on the input shaft (1), a vehicle speed detecting means (50) for detecting the vehicle speed, a driving control circuit (100) for generating a torque magnitude signal (Sa) and a torque direction signal (Sdr, Sdl), based on an output signal (VR, VL) from the torque detecting means (11) and an output signal (Vf) from the vehicle speed detecting means (50), to feed the electric motor (18) with an armature current (Io) of such a magnitude and in such a direction as desirous in accordance with both the torque magnitude signal (Sa) and the torque direction signal (Sdr, Sdl), and a dead zone ($2K_1$ or Dl, Dm, Dh) set for the torque magnitude signal (Sa), an improvement comprising the dead zone ($2K_1$ or Dl, Dm, Dh) of the torque magnitude signal (Sa) having a band width thereof adapted to be widened in accordance with increase of the vehicle speed, in accordance with the output signal (Vf) of the vehicle speed detecting means (50).

Accordingly, an object of the present invention is to provide an electromagnetic servo device for electric power steering systems for vehicles, which, while the vehicle speed is in a low speed region, and particularly, even under such a condition that the vehicle speed is close to zero, permits, at the initial phase of rotating operation of a steering wheel, the steering operation to be lightly performed and, besides, while the vehicle speed is in a high speed region, enables an electric motor in the servo device to be substantially kept from starting rotation, thereby preventing on and off states thereof from frequently alternating therebetween, so that the power steering system has increased durability.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

In the drawings

FIGS. 2A-1 to 2A-8 as well as FIGS. 2B-1 to 2B-4 and 2B-6 are graphs showing output characteristic curves of various circuit elements of the driving control circuit of FIG. 1;

FIG. 3 is a circuit diagram of a motor driving circuit in the driving control circuit of FIG. 1;

FIG. 4 is a longitudinal quarter sectional view of an electromagnetic servo unit constituting the electromagnetic servo device, taken about its axial centerline, that is as viewed along line IV—IV in FIG. 5A the servo unit being adapted to be controlled by the driving control circuit of FIG. 1;

FIG. 5A is a full sectional view showing an essential part of a torque detection mechanism of the electromagnetic servo unit, along line 5A—5A of FIG. 4;

FIGS. 5B and 5C are top and side views of a torque detecting mobile member in the torque detection mechanism of FIG. 5A, respectively;

FIG. 6 is a graph showing input torque vs. output torque characteristic curves of the electromagnetic servo unit of FIG. 4 put under control of the driving control circuit of FIG. 1; and FIG. 7 is a graph showing input torque vs. output torque characteristic curves of a conventional electromagnetic servo device for electric power steering systems for vehicles.

DETAILED DESCRIPTION OF THE PREFERRED EMBODIMENTS

Figure 1:
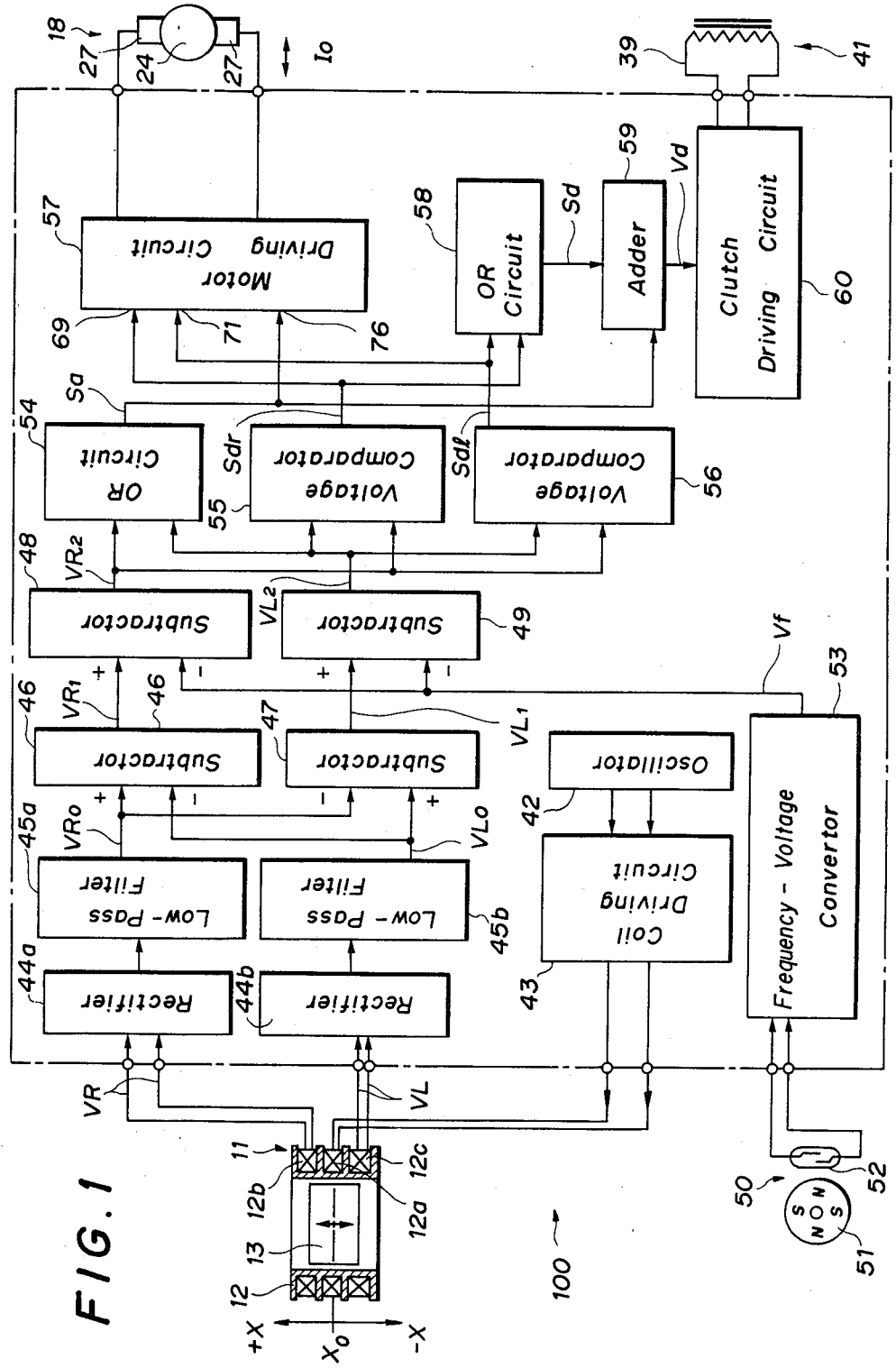
FIG. 1 is a block diagram of a driving control circuit in an electromagnetic servo device for electric power steering systems for vehicles according to a preferred embodiment of the present invention.
Figure 2:
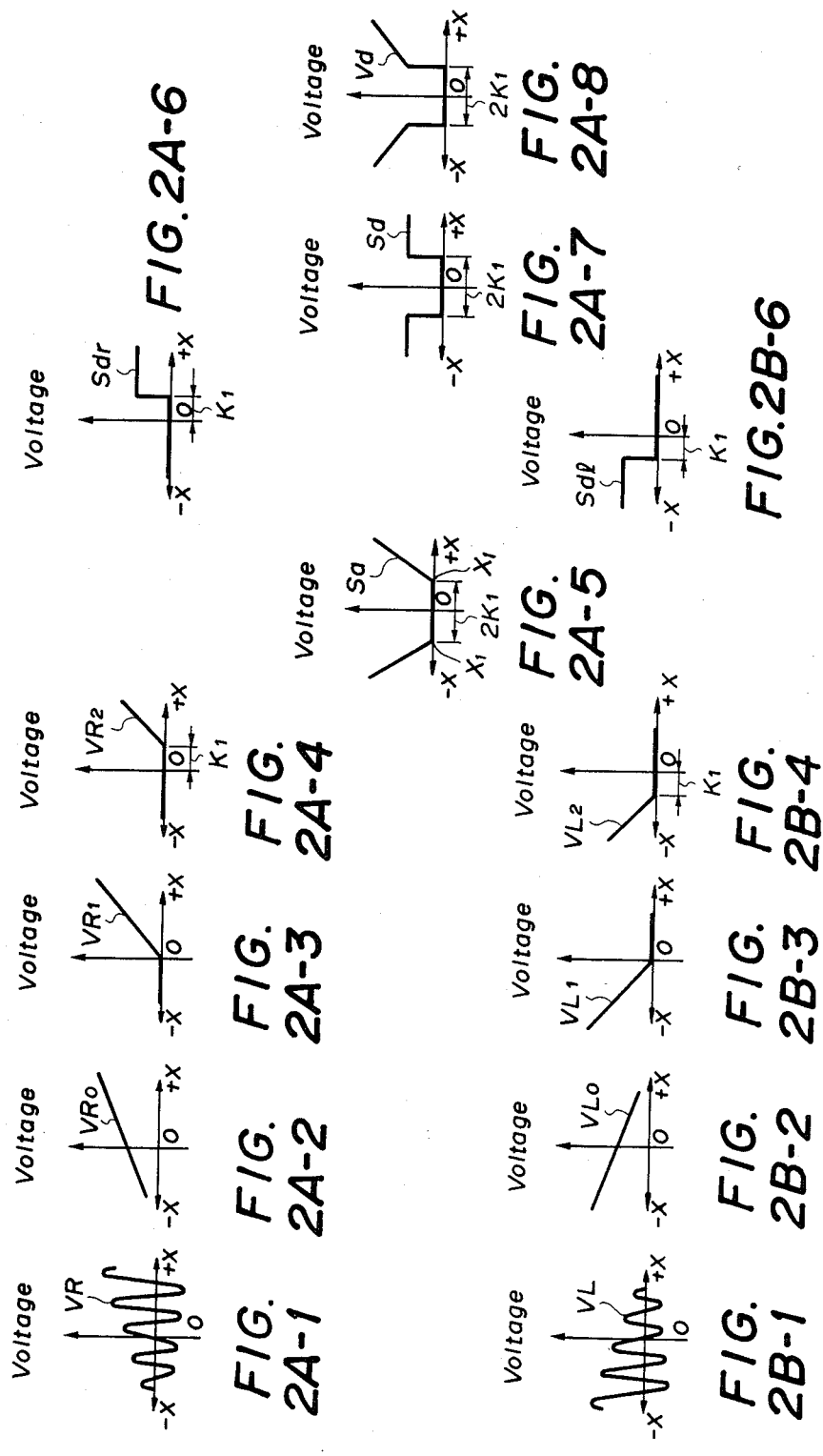

With reference to FIG. 1, designated at reference numeral 100 is the entirety of a driving control circuit of an electromagnetic servo device for electric power steering systems for vehicles according to a preferred embodiment of the present invention.

In FIGS. 2A-1 to 2A-8, 2B-1 to 2B-4, and 2B-6, there are shown output characteristic curves of various circuit elements of the driving control circuit 100.

Figure 3:
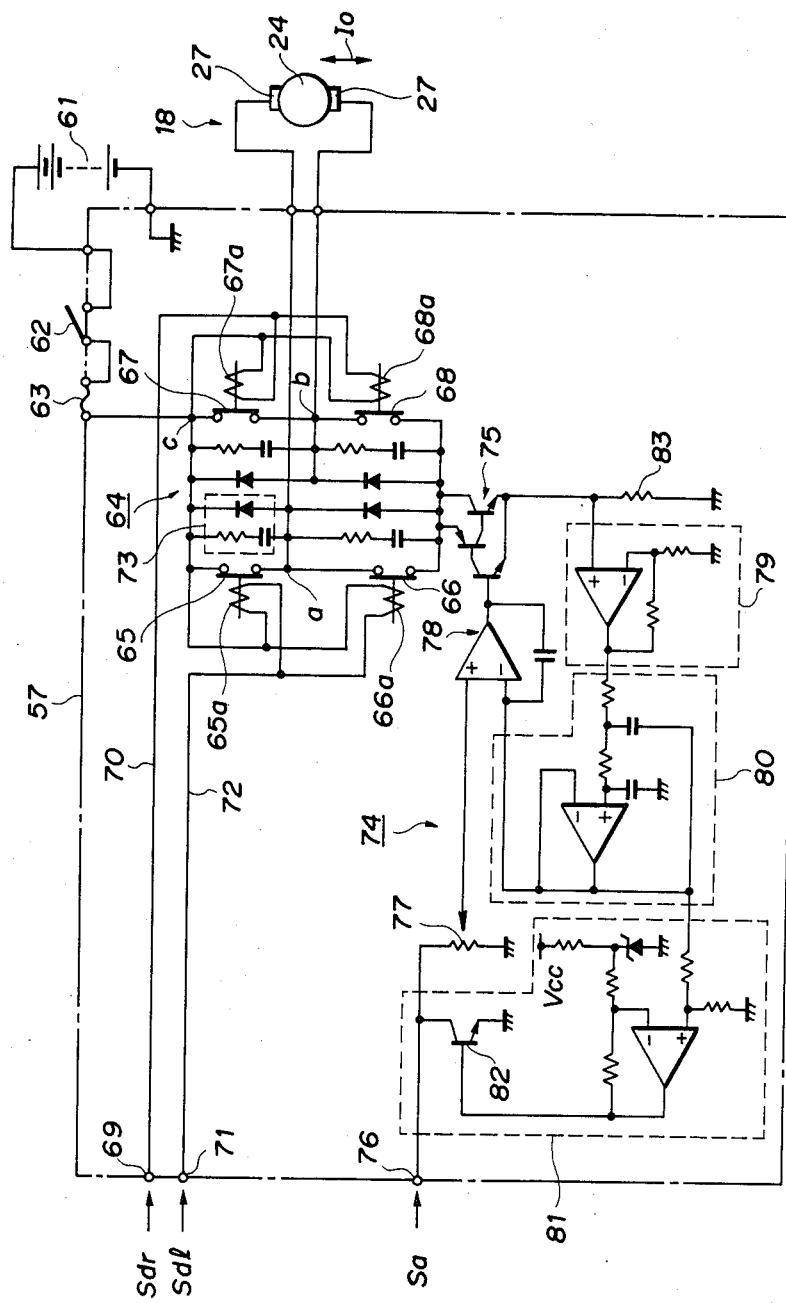

Moreover, in FIG. 3 is shown a circuit diagram of a motor driving circuit 57 in the driving control circuit 100.

Further, in FIGS. 4 and 5A to 5C are shown sectional views of the whole and essential parts, respectively, of an electromagnetic servo unit 200 constituting the electromagnetic servo device, the servo unit 200 being controlled by the driving control circuit 100, which servo unit 200 has been originally developed by the present applicant.

For the aid of comprehension, there will be first described the structure of the electromagnetic servo unit 200 with reference to FIGS. 4 and 5A to 5C, before entering description of the constitution as well as function of the driving control circuit 100.

Figure 4:
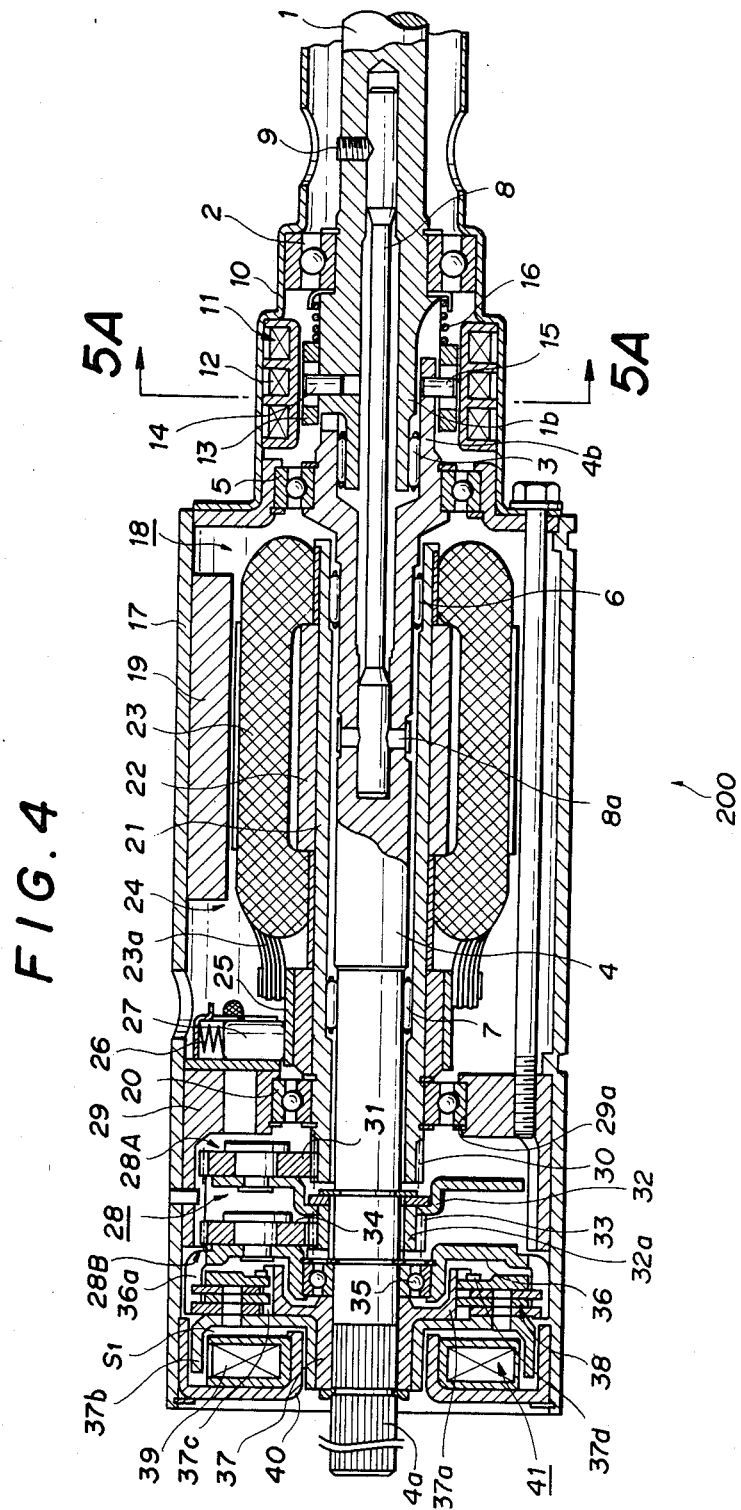

Shown in FIG. 4 is the sectional view as described, and more particularly, a quarter cutaway longitudinal sectional view of the electromagnetic servo unit 200.

The servo unit 200 is now supposed to be equipped in an unshown electric power steering system of an unshown vehicle.

The servo unit 200 includes an input shaft 1 rotatably supported by a ball bearing 2 and a needle bearing 3 and connected at the axially outer end thereof to a steering wheel (not shown) of the power steering system, and an output shaft 4 arranged coaxial with the input shaft 1 and interconnected by a torsion bar 8 with the input shaft 1. Also the output shaft 4 is rotatably supported by a ball bearing 5 and needle bearings 6, 7. The output shaft 4 has at the axially outer end thereof a splined portion 4a operatively assembled into a steering gearbox (not shown) of the power steering system.

As later detailed, a uniquely formed axially inner end portion 1b of the input shaft 1 is engaged at the innermost end thereof into a uniquely formed axially inner end portion 4b of the output shaft 4, with the needle bearing 3 interposed therebetween.

The torsion bar 8 is fixed at one end thereof to the output shaft 4 by means of a pin 8a. The other end of the torsion bar 8 has fixed thereto, by means of a screw 9, the input shaft 1 which is thereby adapted to have, while no steering torque is acting thereon, a predetermined angular position about the axis thereof relative to the output shaft 4. In other words, when fixing the torsion bar 8 to the input shaft 1 by using the screw 9, the input shaft 1 is set to have a predetermined intermediate or neutral angular position relative to the output shaft 4.

In the foregoing arrangement, steering torque from the steering wheel is applied to the input shaft 1, and transmitted therefrom through the torsion bar 8 to the output shaft, causing torsional deformations in the torsion bar 8.

Incidentally, in FIG. 4, designated at reference numeral 10 is a steering column surrounding to accommodate therein the input shaft 1.

The servo unit 200 has, at an axial position thereof where the inner end portion 1b of the input shaft 1 is engaged into the inner end portion 4b of the output shaft 4, a torque detection mechanism 11 arranged so as to extend therearound and adapted for detecting torque acting on the input shaft 1 as differential torque between torque developed at the input shaft 1 and torque developed at the output shaft 4. The detection mechanism 11 comprises a differential transformer 12 fixed on the inner circumference of the steering column 10 and a tubular mobile member 13 axially slidably fitted around the mutually engaged end portions 1b, 4b of the input and output shafts 1, 4. The differential transformer 12 has a pair of output terminals connected to the driving control circuit 100 (FIG. 1), which thus receives a pair of later-described electric signals VR, VL (FIG. 1) representing the differential torque between the input and output shafts 1, 4. The driving control circuit 100 has a function of determining the magnitude and the direction of conduction of an armature current Io to be fed to a later described electric motor 18, in accordance with the steering torque.

As shown in FIG. 5A, the mobile member 13 is engaged with the input shaft 1 by means of a pair of radial pins 14, 14 fixed to the axially inner end portion 1b of the input shaft 1, and with the output shaft 4 by means of another pair of radial pins 15, 15 fixed to the axially inner end portion 4b of the output shaft 4, the radial pins 15, 15 being each respectively angularly spaced apart at 90° from one of the radial pins 14, 14, so that the pins 14, 15 are disposed at quarter points in the circumferential direction as shown by line IV—IV. For the engagement with the radial pins 14, 14 projecting from the input shaft 4, the mobile member 13 has a pair of engagement holes 13a formed therethrough at corresponding angular positions so as to elongate in the axial direction of the torsion bar 8. Also for the engagement with the radial pins 15, 15 projecting from the output shaft 4, the mobile member 13 is formed therethrough with a pair of engagement holes 13b, which holes 13b elongate at a skewed angle with respect to the axial direction of the torsion bar 8. The mobile member 13 is normally biassed in the axial direction, to the left in FIG. 4, with a coil spring 16 compressed to be interposed between this member 13 and the aforesaid ball bearing 2.

In the foregoing arrangement, between each of the radial pin 15 and corresponding one of the elongate holes 13b there are clearences due to the precision of workmanship. However, at one side 13c or the working side of the hole 13b, any play due to such clearance between the pin 15 and the hole 13b is substantially eliminated by the presence of the spring 16 that normally urges the pin 15 into abutment with the working side 13c, while the other side 13d of the hole 13 has a corresponding play 1 left against the pin 15.

According to the foregoing arrangement, when the input shaft 1 is forced to rotate by steering torque applied to the steering wheel, thus transmitting torque through the torsion bar 8 to the output shaft 4, there is developed a phase difference or relative angular displacement between the input and output shafts 1, 4, causing the mobile member 13 to axially move, to the right or left in FIG. 4, in accordance with the sign and absolute value of the phase difference, that is, the direction and magnitude of the relative angular displacement.

In this respect, under the condition that no steering torque is applied to be transmitted to the input shaft 1, the mobile member 13 is set to be kept at a predetermined axial position on the input shaft 1, where the radial pins 14, 15 are located at the longitudinally central parts of the elongate holes 13a, 13b of the member 13, respectively. Accordingly, when steering torque is applied, the resultant axial displacement of the mobile member 13 corresponds in direction to and is proportional in magnitude to the differential torque that is then so developed between the input and output shafts 1, 4 as to act on the input shaft 1. For example, in FIG. 4, when the input shaft 1 as viewed from the right is forced to rotate clockwise relative to the output shaft 4, the mobile member 13 is caused to axially move to the right or toward the observer, or in other words, it is then caused to move upwardly in FIG. 5B. The differential transformer 12 is adapted to detect such differential torque, by potentiometrically measuring the axial displacement of the mobile member 13.

As shown in FIG. 4, the servo unit 200 includes a cylindrical casing 17 accommodating therein the aforesaid electric motor 18 coaxially arranged around the output shaft 4. The electric motor 18 is constituted with a pair of permanent magnets 19 as a field fixed to the inner circumference of the casing 18, and a rotor 24 as an armature consisting of a tubular shaft 21 rotatably supported by the needle bearings 6, 7 and a ball bearing 20, and an armature core 22 fixed on the tubular shaft 21 and provided with an armature winding 23 arranged so as to cut, when rotated, those lines of magnetic flux developed by the magnets 19. Further, the rotor 24 is provided at the left end thereof with a slip ring commutator 25, to which the armature winding 23 has terminals 23a thereof connected so as to permit an electric current of such a magnitude to be sent therethrough in such a direction as circumstances require. At each of necessary electrical angular positions, a brush 27 is brought into abutment with the slip ring commutator 25, while being normally urged thereagainst with a coil spring 26. Through the brush 27, the armature current Io as controlled is sent from the driving control circuit 100 into the armature winding 23, thereby driving the electric motor 18, so that the rotor 24 is forced to rotate around the output shaft 4, independently thereof, in the same rotating direction as the input shaft 1.

Incidentally, as shown in FIG. 4, the ball bearing 20 rotatably supporting the left part of the tubular shaft 21 of the rotor 24 is fitted in a right opening 29a of a cylindrical ring gear 29 fixed to the inner circumference of the casing 17, which gear 29 is employed as a common ring gear for primary and secondary planetary gearings 28A, 28B constituting a speed reducing mechanism 28 through which the rotation of the rotor 24 is transmitted to the output shaft 4.

In the speed reducing mechanism 28 constituted with the two stages 28A, 28B of planetary gearing, the primary stage 28A consists of a sun gear 30 formed along the outer circumference of the left end part of the tubular shaft 21, the aforesaid ring gear 29, and a triple of planet gears 31 interengaged between the sun and ring gears 30, 29. The planet gears 31 are pivotally attached to a disc-like flanged portion of a first carrier member 32. On the other hand, the secondary stage 28B consists of a sun gear 33 formed along the outer circumference of a tubular shaft 32a integrally joined with the carrier member 32, an axial extension of the ring gear 29, and a triple of planet gears 34 interengaged between the sun and ring gears 33, 29. The planet gears 34 are pivotally attached to a disc-like flanged portion of a second carrier member 36 which is rotatably disposed around the output shaft 4, with a bearing 35 interposed therebetween. The second carrier member 36 has formed, on the peripheral part of the flanged portion thereof, a triple of projections 36a axially projecting therefrom to the left in FIG. 4.

Moreover, as shown in FIG. 4, at the left of the secondary carrier member 36, the output shaft 4 has fixed thereon a tubular member 37 axially non-slidably splinefitted on the splined portion 4a of the shaft 4, which member 37 is radially outwardly stepped at the axially intermediate part thereof to have an annular portion 37a radially opposed to, at the inward side of, the axial projections 36a of the carrier member 36, the annular portion 37a extending by a predetermined length in the axial direction of the shaft 4. The tubular member 37 is provided with an annular element 37b fitted thereon, the element 37b having a channel-like cross section and extending radially so as to almost make contact with the inner circumference of the casing 17, while defining an annular space $S_1$ at the left side thereof in FIG. 4.

The annular portion 37a of the tubular member 37 has formed on the outer circumference thereof a triple of small radial projections 37c angularly spaced apart at equal intervals; and between the annular portion 37a and the axial projections 36a of the carrier member 36, there are interposed four annular clutch plates 38 overlapped to be arranged in a layered manner in the axial direction of the output shaft 4. Of the four clutch plates 38 as numbered from the left in FIG. 4, the first and third ones are engaged with the axial projections of the carrier member 36 in an axially slidable and relatively non-rotatable manner, and the second and fourth ones are engaged with the radial projections 37c of the annular portion 37a of the tubular member 37 in like manner. In this respect, the fourth one of the clutch plates 38 is restricted in its rightward movement in FIG. 4, with a stopper ring 37d fixed on the right end part of the annular portion 37a, and each of the clutch plates 38 has an axially slidable range thereof limited to be very small.

Further, in the left aperture of the casing 17, the servo unit 200 has a coil case 40 accommodating therein an exciting coil 39 to be disposed in the annular space $S_1$ defined by the annular element 37b fixed on the tubular member 37, the exciting coil 39 being connected to a later described clutch driving circuit 60 (FIG. 1). Incidentally, the axial projections 36a, the clutch plates 38, the annular element 37b, and the tubular member 37 are adapted to cooperate together to constitute, with the exciting coil 39, an electromagnetic clutch 41.

In the foregoing arrangement including the electric motor 18, the primary and the secondary planetary gearings 28A, 28B, and the electromagnetic clutch 41, the rotation of the rotor 24 of the motor 18 is transmitted, while being speed-reduced through the gearings 28A, 28B, to the output shaft 4 in accordance with later-described actions of the clutch 41.

Now, with reference to FIG. 1, FIGS. 2A-1 to 2A-8 as well as 2B-1 to 2B-4 and 2B-6, and FIG. 3, there will be described hereinbelow the function of the driving control circuit 100 adapted to control the electric motor 18 and the electromagnetic clutch 41 of the electromagnetic servo unit 200.

In each of FIGS. 2A-1 to 2A-8 as well as 2B-1 to 2B-4 and 2B-6, the axis of abscissa (X) represents the axial displacement of the mobile member 13, while the origin (0) corresponds to the neutral position of the member 13, the positive abscissa (+X) corresponds to upward movements thereof in FIG. 5B, that is, clockwise steering torque, and the negative abscissa (−X) corresponds to downward movements thereof in FIG. 5B, that is, counterclockwise steering torque.

As shown in FIG. 1, the differential transformer 12 has therein the mobile member 13 accommodated so as to be upwardly (+X) and downwardly (−X) displaced from the neutral position Xo in accordance with the direction as well as the magnitude of differential torque developed between the input and output shafts 1, 4.

In the differential transformer 12, there are installed a single primary windings 12a and a pair of secondary winding 12b, 12c. The primary winding 12a is fed with an alternating-current signal from an oscillator 42 through a primary coil driving circuit 43. The secondary windings 12b, 12c are adapted such that, when the mobile member 13 is located at the neutral position Xo, they (12b, 12c) output a pair of alternating-current signals of a predetermined frequency, with an equal amplitude, and such that, when the member 13 is caused to be upwardly (+X) or downwardly displaced (−X), whichever winding (12b for example) is the nearer to the member 13 outputs its alternating-current signal with an increased amplitude and, to the contrary, the other winding (12c for example) which is farther from the member 13 outputs its alternating-current signal with a decreased amplitude.

In this respect, shown in FIG. 2A-1 is an exemplary characteristic curve of output signal VR of the secondary winding 12b, and in FIG. 2B-1 is shown exemplary characteristic curve of output signal VL of the secondary winding 12c, which signals VR, VL are responsible either at VR for clockwise rotation of torque acting on the input shaft 1 and the other at VL for counterclockwise rotation thereof.

The output signals VR, VL from the secondary windings 12b, 12c are first rectified through a pair of rectifiers 44a, 44b and then smoothed by a pair of low-pass filters 45a, 45b to output a pair of smoothed signals VRo, VLo, respectively. The output signal VRo from the low-pass filter 45a and the output signal VLo from the low-pass filter 45b, which have characteristic curves thereof exemplarily shown in FIGS. 2A-2 and 2B-2, respectively, are input to a pair of subtractors 38, 39, where they are processed through a pair of subtractive operations such that, at the subtractor 46, the output signal $VR_1 = VRo - VLo$ provided that $VR_1$ becomes nearly equal to zero when $VRo \leq VLo$ and, at the subtractor 47, the output signal $VL_1 = VLo - VRo$ provided that $VL_1$ becomes nearly equal to zero when $VLo \leq VRo$. As a result, the subtractors 46, 47 have such characteristic curves of their output signals $VR_1$, $VL_1$ as are exemplarily shown in FIGS. 2A-3, 2B-3, respectively.

The differential transformer 12 is now supposed to be connected such that, as the mobile member 13 is displaced from the neutral position Xo upwardly in FIG. 1, that is, toward the secondary winding 12b, the magnitude of the signal $VR_1$ straight-linearly increases from zero in proportion to the upward displacement of the member 13, and such that, as the member 13 is displaced from the neutral position Xo downwardly, that is, toward the secondary winding 12c, the magnitude of the signal $VL_1$ straight-linearly increases from zero in proportion to the downward displacement of the member 13.

Then, the output signal $VR_1$ of the subtractor 46 is input to another subtractor 48, and the output signal $VL_1$ of the subtractor 47 is input to still another subtractor 49.

Incidentally, in FIG. 1, designated at reference numeral 50 is a vehicle speed sensor. The vehicle speed sensor 50 comprises a magnet rotor 51 adapted to rotate in accordance with the speed of the vehicle, and a reed swtch 52 adapted to repeat on-off actions at a frequency depending on the rotation of the magnet rotor. The reed switch 52 has an output signal therefrom input to an F-V (frequency to voltage) converter 53, where it is converted into a voltage signal Vf proportional to the vehicle speed, which signal Vf is fed to both of the subtractors 48, 49. Though unshown, the voltage of the signal Vf is proportionally increased from zero, as the vehicle speed increases from zero.

At the subtractor 48, to output a signal $VR_2$, there is performed a subtractive operation such that $VR_2 = VR_1 - Vf$ provided that $VR_2$ becomes nearly equal zero when $VR_1 \leq Vf$. For the output signal $VR_2$, therefor, such a characteristic curve is given as exemplarily shown in FIG. 2A-4. The characteristic curve has defined a dead zone over a positive interval $K_1$ with a band width such that $K_1 = kv$, where k is a proportional constant and v is the vehicle speed, so that the band width is in a directly proportional relation to the vehicle speed.

Also at the subtractor 49, a subtractive operation is performed such that $VL_2 = VL_1 - Vf$ provided that $VR_2$ becomes nearly equal to zero when $VR_1 \leq Vf$, to thereby obtain a signal $VR_2$ to be output therefrom. For the output signal $VR_2$, such a characteristic curve is given as exemplarily shown in FIG. 2B-4, which characteristic curve has defined a dead zone over a negative interval $K_1$ with like band width in direct proportion to the vehicle speed.

Incidentally, the control circuit 100 has as the power source thereof no more than a single power supply (not shown) of positive polarity, except for power sources of the oscillator 42 and the primary coil driving circuit 43. For such reasons, each of the subtractors 46, 47, 48, 49 has its output signal set to be substantially zero volts at the positive voltage side, when its negative input terminal is fed with an input signal of a voltage not larger than that of an input signal fed to its positive input terminal.

Further, with reference to FIG. 1, the output signals $VR_2$, $VL_2$ of the subtractors 48, 49 are both fed to an analogue OR circuit 54 and a pair of voltage comparators 55, 56. At the OR circuit 54, the input signals $VR_2$, $VL_2$ are synthesized to obtain a signal Sa to be output therefrom. The signal Sa, a characteristic curve of which is such as exemplarily shown in FIG. 2A-5, is employed as a torque magnitude signal for controlling the magnitude of the armature current Io to be fed to the electric motor 18, so that the magnitude of the current Io is directly proportional to the that of the signal Sa, as will be described later.

From the voltage comparators 55, 56 are output a pair of signals Sdr, Sdl, respectively, which are commonly employed for controlling the rotating direction of the electric motor 18 and the action of the electromagnetic clutch 41. As exemplarily shown in FIG. 2A-6, the output signal Sdr is a step signal that assumes a "high" level when the input signal $VR_2$ has a larger voltage than the input signal $VL_2$. On the other hand, as exemplarily shown in FIG. 2B-6, also the output signal Sdl is a step signal, which assumes a "high" level when the input signal $VL_2$ has a larger voltage than the input signal $VR_2$. As a result, also for each of the signals Sdr, Sdl, there is formed a dead zone with the band width $K_1$ in direct proportion to the vehicle speed.

The output signal Sa of the OR circuit 54 is input as a torque magnitude signal to the motor driving circuit 57, and the output signals Sdr, Sdl of the comparators 55, 56 are input thereto as torque direction signals. The detailed constitution of the motor driving circuit 57 will be described later.

The output signals Sdr, Sdl as torque direction signals are input also to another analog OR circuit 58, where they are processed to be synthesized to obtain a torque direction signal Sd having such a characteristic as that exemplarily shown in FIG. 2A-7. The torque direction signal Sd is output from the OR circuit 58 and then input to an adder 59, where it is added to the torque magnitude signal Sa input to the adder 59 from the OR circuit 54, thereby generating such a control signal Vd as exemplarily shown in FIG. 2A-8, which signal Vd is output from the adder 59 to be input to the electromagnetic clutch driving circuit 60.

Incidentally, the motor driving circuit 57 is adapted to feed the electric motor 18 with the armature current Io of such a magnitude and in such a direction as necessary in accordance with the torque magnitude signal Sa and the torque direction signals Sdr, Sdl. More particularly, the armature current Io is fed to the electric motor 18 with such a magnitude that is determined in correspondence to the voltage of the torque magnitude signal Sa and in such a direction that is selected depending on the torque direction signals Sdr, Sdl so as to cause the rotor 24 to rotate clockwise, when the mobile member 13 is displaced in a positive direction thereof corresponding to the positive abscissa (+X) so long as in FIG. 2A-5 the positive boundary (at positive $X_1$) of the dead zone is exceeded, and to rotate counterclockwise, when the member 13 is displaced in a negative direction thereof corresponding to the negative abscissa (−X) so far as the negative boundary (at negative $X_1$) of the dead zone is exceeded.

On the other hand, the output signal Vd of the adder 59, which is the result of addition of the torque magnitude signal Sa and the torque direction signal Sd as seen from FIG. 2A-8, is input to the clutch driving circuit 60, which is adapted to feed the exciting coil 39 of the electromagnetic clutch 41 with a controlled electric current of such a magnitude that is proportional to the voltage of the signal Vd, to thereby excite the clutch 41.

As will be understood from the foregoing description, under such a condition that the armature current Io fed to the electric motor 18 has a positive value above zero and hence the motor 18 is rotating, the electromagnetic clutch 41 is always kept excited. Moreover, the larger the armature current Io becomes, the clutching force of the clutch 41 becomes all the more strong. Or in other words, the clutching force becomes all the more strong, as the steering torque acting on the input shaft 1 becomes larger in magnitude.

Referring now to FIG. 3, which is a circuit diagram of the electric motor driving circuit 57, the circuit 57 will be described below with regards to the control actions that it takes upon the electric motor 18 in accordance with the torque magnitude signal Sa and the torque direction signals Sdr, Sdl.

First, the control of rotating direction of the rotor 24 will be described.

As shown in FIG. 3, the motor driving circuit 57 is provided with a direct-current power source 61 as a power supply for supplying a direct current to be utilized as the armature current Io, which direct current is supplied through a power switch 62 and a fuse 63 to a direction control circuit 64 adapted to determine the direction of conduction of the armature current Io. The direction control circuit 64 comprises four relay switches 65, 66, 67, 68 controlled for on-off actions thereof by four exciting coils 65a, 66a, 67a, 68a, the relay switches 65, 66, 67, 68 being interconnected into a bridge having output terminals a, b thereof connected to the brushes 27 of the electric motor 18. The exciting coils 65a, 66a, 67a, 68a of the relay switches 65, 66, 67, 68 are connected to a line 70 provided with an input terminal 69, whereto the torque direction signal Sdr is input, and to another line 72 provided with another input terminal 71, whereto the torque direction signal Sdl is input. The connection of the coils 65a, 68a to the lines 70, 72 is made the same in the direction of conduction, while that of the coils 66a, 67a to the lines 70, 72 is reversed, so that, when the direction signal Sdr input to the terminal 69 is turned to the "high" level, the switches 66, 67 open and concurrently the switches 65, 68 close and, to the contrary, when the direction signal Sdl input to the terminal 71 is turned to the "high" level, the switches 65, 68 open and concurrently the switches 66, 67 close.

As a result, the direction of the armature current Io is selected to be either from the terminel a to terminal b or from the terminal b to terminal a. More particularly, when the direction signal Sdr is at the "high" level, only the relay switches 65, 68 are closed, so that the direct current from the power source 61 is sent through a bridge terminal c, the switch 65, and the terminal a to the electric motor 18 and then returned from the motor 18, through the terminal b to the switch 68. To the contrary, when the direction signal Sdl is at the "high" level, only the relay switches 66, 67 are closed, so that the direct current from the power source 61 is sent through the terminal c, the switch 67, and the terminal b to the electric motor 18 and then returned from the motor 18 through the terminal a to the switch 66.

Incidentally, to each of the relay switches 65, 66, 67, 68, there is connected in parallel a protection circuit 73 consisting of a diode, a resistor, and a condenser, to thereby prevent the discharge of sparks attendant the on-off actions of the switches 65 to 68.

The motor driving circuit 57 further includes a magnitude control circuit 74 for controlling the magnitude of the armature current Io. The control circuit 74 has a below described signal input therefrom to a transistor circuit 75 consisting of a triple of high-power transistors connected in series, at which circuit 75 the magnitude of the current Io is controlled in proportion to the signal input thereto.

In the magnitude control circuit 74, which is provided with a terminal 76 for receiving the torque magnitude signal Sa, this signal Sa is divided by a resistor 77 into a necessary voltage and then input to an amplifier 78, where it is amplified to obtain the aforesaid signal input to the transistor circuit 75. Therefore, the armature current Io to be fed to the electric motor 18 has a magnitude proportional to the voltage of the torque magnitude signal Sa, so that the output shaft 4 is applied with auxiliary torque of a magnitude proportional to the magnitude signal Sa.

The magnitude control circuit 74 further includes a non-inverting amplifier 79, a low-pass filter 80, and an overcurrent prevention circuit 81. The mangitude of the armature current Io is detected, by means of a resistance 83, in the form of a voltage signal, which signal is fed back through the non-inverting amplifier 79 and the low-pass filter 80 to the amplifier 78, as well as to a transistor 82 in the overcurrent prevention circuit 81, the transistor 82 being connected in parallel to the resistor 77. In such circuit arrangement, when the armature current Io is brought into an overcurrent state, the transistor 82 becomes on, interrupting the supply of the magnitude signal Sa to the resistor 77, so that the current Io is prevented from being sent with excessive amperage to the electric motor 18.

As will be understood from the foregoing description, in the motor driving circuit 57, the armature current Io to be fed to the electic motor 18 is controlled in its magnitude in accordance with the torque magnitude signal Sa input from the OR circuit 54, and in its direction of conduction in accordance with the torque direction signals Sdr, Sdl input from the voltage comparators 55, 56.

As already described, in the driving control circuit 100, the signal Vf having a voltage thereof increased in proportion to the vehicle speed is subtracted in terms of voltage at the subtractors 48, 49 from the signals $VR_1$, $VL_1$, to obtain the signals $VR_2$, $VL_2$. In this respect, when considering to only the signals $VR_1$ and $VR_2$ for example, the subtraction of the voltage of the signal Vf from that of the signal $VR_1$ means, in FIG. 2A-3, downwardly translating the characteristic curve or line segment of $VR_1$ by a distance corresponding to the voltage of Vf. Such downward translation of the line segment $VR_1$ gives the characteristic curve of $VR_2$ in FIG. 2A-4, whereas the signal $VR_2$ has no range of negative values in the control circuit 100 using a single positive power source as described. Also the signals $VL_1$ and $VL_2$ have like relation therebetween.

Accordingly, for the signals $VR_2$, $VL_2$, the band width $K_1$ of the dead zone becomes large in direct proportion to the vehicle width. As a result, the torque magnitude signal Sa obtained by synthesizing the signals $VR_2$, $VL_2$ at the OR circuit 54 has a band width ($2K_1$) double that of the original width $K_1$ and hence is still proportional to the vehicle speed. The synthesized band width $2K_1$ may well be considered as an apparent dead zone of the torque detection mechanism 11.

The dead zone width $2K_1$ is narrow in a low speed region of the vehicle speed, and becomes all the more wide, as the vehicle speed becomes higher; and, in a certain high speed region, it may occupy a wider interval than the domain $T_3'$ of FIG. 7 otherwise would. In such high speed region, therefore, even while steering torque is applied to the input shaft 1, the electric motor 18 is kept from starting, so that the power steering system is put in a non-assisted state thereof, thus being left as it is operated simply in a manual manner.

In this respect, under the condition that the electric motor 18 is kept from starting, the steering torque applied to the input shaft 1 is transmitted, as it is, through the torsion bar 8 to the output shaft 4. Particularly, when the load borne by the output shaft 4 is larger than a predetermined quantity, the steering torque applied to the input shaft 1 is completely directly transmitted to the output shaft 4, by the effect of abutment between engagement surfaces 1c of a fan-like recessed part of the axially inner end portion 1b of the input shaft 1 and opposing engagement surfaces 4c of an arcuately projected part of the axially inner end portion 4b of the output shaft 4, FIG. 5A.

FIG. 6 is a graph similar to FIG. 7, showing an input-output characteristic of the electric power steering system, and more particularly, various relations between steering torque Ti acting on the input shaft 1 and output torque To from the output shaft 4 of the electromagnetic servo unit 200.

In FIG. 6, the axis of abscissa represents the steering torque Ti acting on the input shaft, and the axis of ordinate represents the output torque To from the output shaft 4. Designated at reference characters Dl, Dm, Dh are such apparent dead zones that the torque detection mechanism 11 of the servo unit 200 has when the vehicle speed is at certain typical speeds in low, middle, and high speed regions thereof, respectively; $T_1$, $T_2$, $T_3$ are maximum values in such ranges of values of the output torque To that the servo unit 200 is permitted to have while the vehicle speed is kept at the above typical speeds, respectively; and $T_1''$, $T_2''$, $T_3''$ are such domains of definition of the steering torque Ti that correspond to the above ranges of values, respectively.

Now, for the aid of comprehension, description will be made below only of a region extended to at the right of an origin O of the graph of FIG. 6, that is, of such characteristic relations that of the steering torque Ti to the output torque To, when the former is acting in a clockwise direction about the input shaft. Those relations depicted in the left half region of the graph are analogous to those depicted in the above-defined right half region, and will be easily understood from the following description.

While the vehicle speed is kept at the given typical speed in the low speed region, as the steering torque Ti acting on the input shaft is increased from zero, the output torque To increases, in the interior of the dead zone Dl, along a line segment Th' straightly extending from the origin O with a certain positive gradient and, in the exterior of the dead zone Dl, along a line segment Tl' straightly extending, from the cross point between the line segment Th' and the boundary of the dead zone Dl, with a larger gradient than the gradient of the line segment Th'.

While the vehicle speed is kept at the given typical speed in the middle speed region, as the steering torque Ti is increased from zero, the output torque To increases, in the interior of the dead zone Dm, again along the line segment Th' and, in the exterior of the dead zone Dm, along another line segment Tm' straightly extending, from the cross point between the line segment Th' and the boundary of the dead zone Dm, with subtantially the same gradient as the the line segment Tl'. This is because, in the exterior of the apparent dead zone ($2K_1$), the gradient of the characteristic curve of the torque magnitude signal Sa itself is constant independently of the vehicle speed, as shown in FIG. 2A-5.

On the other hand, while the vehicle speed is kept within such a high speed range that covers, including the given typical speed in the high speed region, those vehicle speeds equal to or higher than a predetermined speed in the high speed region, as the steering torque Ti is increased from zero, the output torque To increases along the line segment Th', thus simply corresponding to the steering torque Ti. This is because, in such high speed range, the apparent dead zone of the torque detection mechanism 11 has a band width exceeding the interval of the domain of definition of the steering torque Ti, like the relation which the dead zone Dh has to the domain $T_3''$.

In this respect, it should be noted that the respective line segments Tl', Tm', Th' are inherently defined within the correspondent domains $T_1''$, $T_2''$, $T_3''$, that is, at solid line parts thereof in FIG. 6, whereas broken line extensions are provided for better comparison.

The input-output characteristics of the electric power steering system, as it is illustratively represented by FIG. 6, is derived from such a feature according to the present invention that the dead zone ($2K_1$) of the torque detection mechanism 11 has a band width varied to be widened from zero as the vehicle speed increases from zero.

Accordingly, in the electromagnetic servo unit 200, the proportion that the width of the dead zone ($2K_1$) occupies in the interval of the domain of definition of the steering torque Ti, that is, the ratio $D_1/T_1'''$ in FIG.

6, is relatively small while the vehicle speed in in the low speed region. Particularly when the speed is close to zero, such proportion becomes substantially zero.

As a result, even in an initial phase of the rotating operation of the steering wheel, the electric motor 18 in the electromagnetic servo unit 200 is promptly started, so that the vehicle's driver is not required to exert large steering forces to the steering wheel, or in other words, the steering operation feels light.

Moreover, even while the vehicle speed is in the middle speed region, as exemplarily illustrated in FIG. 6, the proportion of the width of the dead zone (e.g. Dm) to the interval of the domain (e.g. $T_2''$) of the steering torque Ti, that is, the ratio $Dm/T_2''$ in FIG. 6, is little different from that (e.g. the ratio $Dl/T_1''$) in the low speed range. Therefore, when put to practical use, the servo unit 200 is favorably prevented against frequent repetition of on-off actions that otherwise would be experienced at the electric motor, thus assuring improved durability of the unit 200 as well as of the entire steering system.

Particularly when the vehicle speed is kept within the high speed range above the aforesaid predetermined high speed, the input shaft 1 is directly coupled with the output shaft 4, while holding the electric motor 18 in a substantially cut-off state, thus further improving the durability of the servo unit 200 itself and of the entire steering system.

According to the present invention, as will be understood from the foregoing description of the preferred embodiment, there is provided an electromagnetic servo device (200) for electric power steering systems for vehicles, in which the dead zone ($2K_1$) of a torque detection mechanism (11) has a band width variable with the vehicle speed, such that it is kept narrow at vehicle speeds in a low speed region and becomes wide as the vehicle speed increases. As a result, in the low speed region, the operation of a steering wheel is effectively lightened at the initial phase and, in middle and high speed regions, the frequency of repetition of on-off actions of an electric motor (18) is favorably reduced, thereby achieving improved durability of the servo unit.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrective. The scope of the invention is indicated by the appended claims rather than by the foregoing description.

I claim:

1. In an electromagnetic servo device (200) for an electric power steering system for vehicles having a steering wheel and a steered wheel, said servo device (200) including:
   an input shaft (1) adapted to be connected to the steering wheel;
   an output shaft (4) adapted to be operatively interconnected with the steered wheel;
   an electric motor (18) for providing said output shaft (4) with auxiliary torque;
   torque detecting means (11) for detecting steering torque (Ti) acting on said input shaft (1);
   vehicle speed detecting means (50) for detecting the vehicle speed;
   a driving control circuit (100) for generating a torque magnitude signal (Sa) and a torque direction signal (Sdr, Sdl), based on an output signal (VR, VL) from said torque detecting means (11) and an output signal (Vf) from said vehicle speed detecting means (50), to feed said electric motor (18) with an armature current (Io) of such a magnitude and in such a direction as desirous in accordance with both said torque magnitude signal (Sa) and said torque direction signal (Sdr, Sdl); and
   a dead zone ($2K_1$ or Dl, Dm, Dh) set for said torque magnitude signal (Sa),
   an improvement comprising:
   said dead zone ($2K_1$ or Dl, Dm, Dh) of said torque magnitude signal (Sa) having a band width thereof adapted to be widened in accordance with increase of the vehicle speed, in accordance with said output signal (Vf) of said vehicle speed detecting means (50).

2. An electromagnetic servo device according to claim 1, wherein:
   said output signal (Vf) from said vehicle speed detecting means (50) comprises a vehicle speed signal (Vf) having a value thereof gradually increasing from zero in proportion to the vehicle speed, as the vehicle speed gradually increases from zero.

3. An electromagnetic servo device according to claim 2 wherein:
   said torque magnitude signal (Sa) is obtained by subtracting said value of said vehicle speed signal (Vf) from a value of a signal ($VR_1, VL_1$) obtained based on said output signal (VR, VL) from said torque detecting means (11).

4. An electrogmagnetic servo device according to claim 3, wherein:
   said band width of said dead zone ($2K_1$ or Dl, Dm, Dh) of said torque magnitude signal (Sa) gradually increases from zero, as the vehicle speed gradually increases from zero.

5. An electromagnetic servo device according to claim 4, wherein:
   when the vehicle speed is in a high speed region, said band width of said dead zone ($2K_1$ or Dl, Dm, Dh) of said torque magnitude signal (Sa) is wider than a domain ($T_3''$) of said steering torque (Ti) acting on said input shaft (1), so that said electric motor (18) is kept from starting, and said input shaft (1) and said output shaft (4) are directly connected to each other.

6. An electromagnetic servo device according to claim 1, further comprising:
   speed reducing means (28) interposed between said electric motor (18) and said output shaft (4), for transmitting rotational torque of said electric motor (18), while reducing the speed, to said output shaft (4).

7. An electromagnetic servo device according to claim 6, further comprising:
   electromagnetic cluth means (41) interposed between said speed reducing means (28) and said output shaft (4).

8. An electromagnetic servo device according to claim 7, wherein:
   said electromagnetic clutch means (41) is controlled to be operated by said driving control circuit (100), in accordance with a signal (Vd) obtained by synthesizing said torque magnitude signal (Sa) and said torque direction signal (Sdr, Sdl) with each other.

* * * * *

UNITED STATES PATENT AND TRADEMARK OFFICE
CERTIFICATE OF CORRECTION

PATENT NO. : 4,687,976
DATED : August 18, 1987
INVENTOR(S) : SHIMIZU

It is certified that error appears in the above-identified patent and that said Letters Patent is hereby corrected as shown below:

On the cover page, Item [73], the name of the Assignee should read --Honda Giken Kogyo Kabushiki Kaisha--.

Signed and Sealed this

Sixteenth Day of February, 1988

Attest:

DONALD J. QUIGG

*Attesting Officer*  *Commissioner of Patents and Trademarks*